Figure 1:
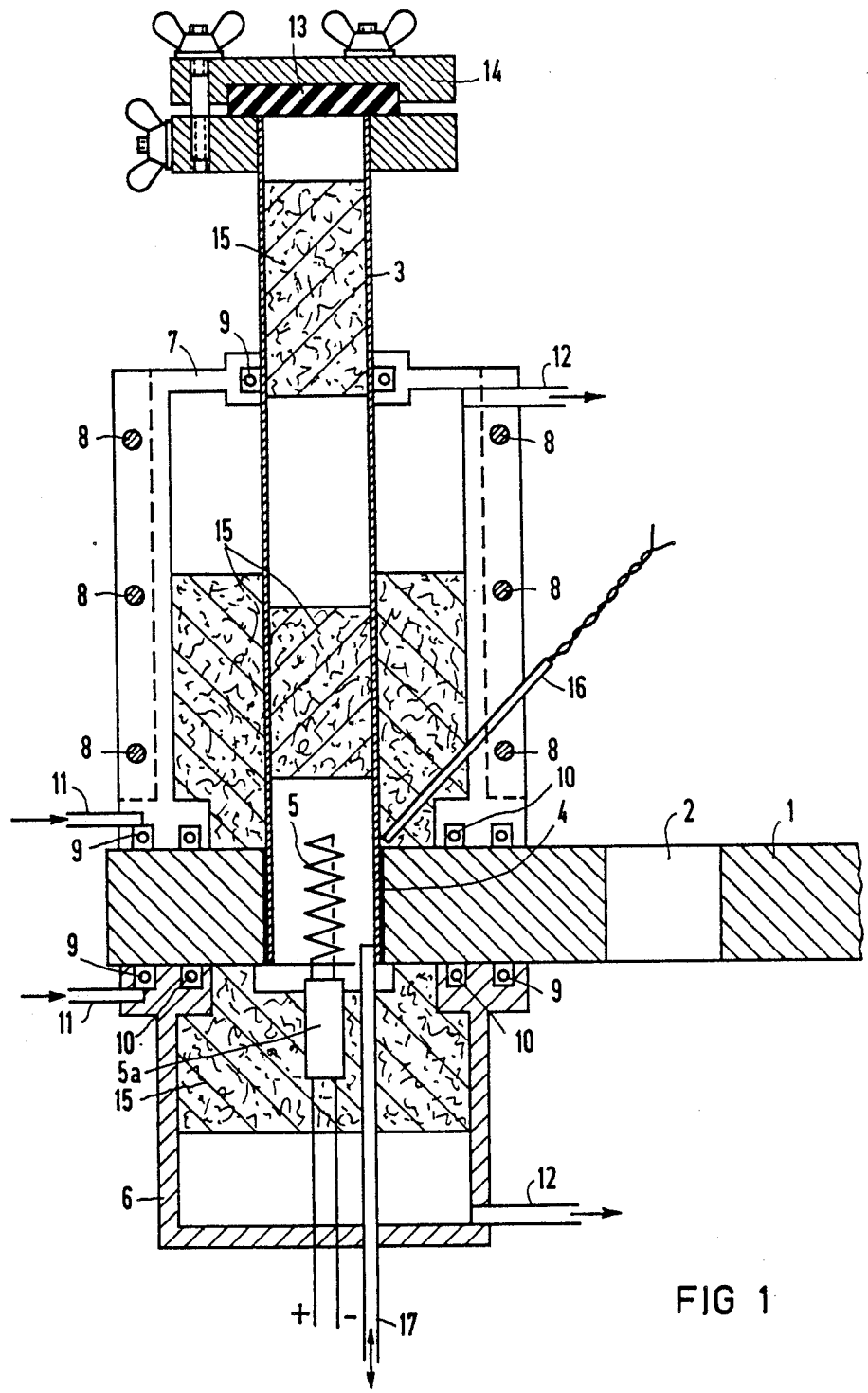

United States Patent [19]

Yarahmadi et al.

[11] Patent Number: 4,969,592

[45] Date of Patent: Nov. 13, 1990

[54] METHOD FOR UNITING WORKPIECES OF SILICON-INFILTRATED SILICON CARBIDE WITH LARGE DIMENSIONS IN A MATERIALLY BONDED MANNER AND APPARATUS FOR PERFORMING THE METHOD

[75] Inventors: Mohamed Yarahmadi, Fulda; Hartmut Kainer, Wiesbaden; Juergen Sommerer, Rauenthal, all of Fed. Rep. of Germany

[73] Assignees: Interatom GmbH, Bergisch Gladbach; Didier-Werke AG, Wiesbaden, both of Fed. Rep. of Germany

[21] Appl. No.: 369,612

[22] Filed: Jun. 21, 1989

[30] Foreign Application Priority Data

Jun. 28, 1988 [DE] Fed. Rep. of Germany ....... 3821804

[51] Int. Cl.$^5$ .................... B23K 1/005; B23K 1/18; B23K 1/19; B23K 101/14
[52] U.S. Cl. .................... 228/42; 228/44.5; 228/121; 228/219; 228/221; 228/242; 228/183; 219/85.12; 219/85.17
[58] Field of Search ............... 228/121, 183, 218, 219, 228/221, 242, 263.12, 42, 44.5; 219/85.12, 85.13, 85.17

[56] References Cited

U.S. PATENT DOCUMENTS

| | | | |
|---|---|---|---|
| 3,153,716 | 10/1964 | Schroeder | 228/219 |
| 3,377,696 | 4/1968 | Darrow | 228/219 |
| 3,557,440 | 1/1971 | Haberecht | 228/121 |
| 3,813,759 | 6/1974 | Heap et al. | 228/121 |
| 3,876,852 | 4/1975 | Topham | 228/219 |
| 4,687,892 | 8/1987 | Brolin et al. | 228/219 |

FOREIGN PATENT DOCUMENTS

| | | |
|---|---|---|
| 0076467 | 4/1983 | European Pat. Off. . |
| 0236856 | 9/1987 | European Pat. Off. . |
| 3003186 | 8/1981 | Fed. Rep. of Germany . |
| 580963 | 11/1977 | U.S.S.R. ............... 228/44.5 |

Primary Examiner—Richard K. Seidel
Assistant Examiner—Samuel M. Heinrich
Attorney, Agent, or Firm—Herbert L. Lerner; Laurence A. Greenberg

[57] ABSTRACT

A method and apparatus for uniting workpieces of silicon-infiltrated silicon carbide with large dimensions includes surrounding each of two silicon-infiltrated silicon carbide workpieces with at least one tightly closing shell in the vicinity of a junction between the workpieces, defining at least one intermediate space between the shell and the workpieces. A vacuum or an inert gas atmosphere is maintained in the intermediate space or spaces. Solder is placed at the junction and the junction is locally heated to soldering temperature for materially bonding the workpieces by soldering at the junction.

15 Claims, 2 Drawing Sheets

METHOD FOR UNITING WORKPIECES OF SILICON-INFILTRATED SILICON CARBIDE WITH LARGE DIMENSIONS IN A MATERIALLY BONDED MANNER AND APPARATUS FOR PERFORMING THE METHOD

The invention relates to a method and apparatus for uniting workpieces of silicon-infiltrated silicon carbide with large dimensions in a materially bonded manner by soldering at the union site or junction.

Silicon-infiltrated silicon carbide (SiSiC) is gaining increasing respect as a material for its good mechanical and chemical properties. Joints or unions among several parts or workpieces formed of this material are sometimes produced in the conventional form-locking manner (for instance with screw threads), but such unions are incapable of meeting highly stringent requirements for tightness. A form-locking connection is one which connects two elements together due to the shape of the elements themselves, as opposed to a force-locking connection, which locks the elements together by force external to the elements. Such unions are also made by soldering. Special solders which are made from a titanium-silicon alloy, for instance, have been developed for this purpose. This soldering technique requires both the use of very high temperatures (of approximately 1400° C.) and working in a vacuum or in an inert gas. Thus far, these soldering operations have been performed in soldering ovens large enough to receive at least two parts to be joined or united at the same time. However, practical factors limit the size of these soldering ovens. They are not large enough to hold large components such as heat exchangers that are approximately 10 m in length and approximately 1 m in diameter, for instance.

It is accordingly an object of the invention to provide a method for uniting workpieces of silicon-infiltrated silicon carbide with large dimensions in a materially bonded manner and an apparatus for performing the method, which overcome the hereinafore-mentioned disadvantages of the heretoforeknown methods and devices of this general type and which permit the uniting of parts made of SiSiC to make large components, while simultaneously keeping the apparatus cost low.

With the foregoing and other objects in view there is provided, in accordance with the invention, a method for uniting workpieces of silicon-infiltrated silicon carbide with large dimensions, which comprises surrounding each of two silicon-infiltrated silicon carbide workpieces with a tightly closing shell in the vicinity of a junction between the workpieces, defining an intermediate space between the shell and the workpieces; maintaining a vacuum in the intermediate space or filling the intermediate space with an inert gas; placing solder at the junction; and locally heating the junction to soldering temperature for materially bonding the workpieces by soldering at the junction.

The shells are constructed or shaped in accordance with the particular geometry of the parts or workpieces to be united. They create a space which is closed off from the surroundings and is substantially restricted to the union site or junction. In this space the conditions required for performing the aforementioned soldering process can be created at little expense. Initially, solder is introduced into the seam between the parts. Due to the ensuing, exclusively local heating of the union site or junction, a considerable reduction in the expenditure of energy is attained as compared with the conventional large-area heating. With a plurality of union sites or junctions, the expenditure of energy can be matched precisely to the requirements thereof which may differ.

With the objects of the invention in view, there is also provided an apparatus for uniting workpieces of silicon-infiltrated silicon carbide with large dimensions, comprising one or more shells gas-tightly enclosing each of two siliconinfiltrated silicon carbide workpieces in common or separately in the vicinity of a junction between the workpieces, defining at least one intermediate space between the at least one shell and the workpieces; a line communicating with the at least one intermediate space for maintaining a vacuum or an inert gas atmosphere therein; and a heating element in the vicinity of the junction for locally heating the junction to soldering temperature and materially bonding the workpieces with solder at the junction.

In accordance with another feature of the invention, the heating element is formed of a material from the group consisting of tungsten, iridium and molybdenum and is sufficient for radiating heat onto the junction provided with solder. Since these are materials that are resistant at even high temperature, a possible harmful contamination of the structural material with foreign substances is avoided.

If the aforementioned shells are to be furnished at reasonable expense, then they must be made of some material that is easy to work and is relatively inexpensive, such as a metal like copper. However, such a material must not be exposed to the high temperature necessary for the soldering process. In order to meet this condition, in accordance with a further feature of the invention, there is provided a cooling apparatus for cooling the at least one shell.

In accordance with an added feature of the invention, there is provided an elastomer seal disposed between the at least one shell and the workpieces, which is preferably cooled by the cooling apparatus.

If the different coefficients of thermal expansion of the two parts are taken into account as well, adequate sealing of the space or gap between the workpiece and the shell can be most reliably attained with a seal made from an elastomer. The seal may be disposed at some distance from the union site or junction, and therefore at a site of lower temperature. However, that unnecessarily increases the required size of the shell. Nor is there any assurance that the temperature allowable for the sealing material will not be exceeded. Therefore, the elastomer seal is preferably coolable as well.

In accordance with an additional feature of the invention, there is provided at least one plastically deformable metal seal disposed between the at least one shell and the workpieces, suitably in combination with the elastomer seal. The metal seal is one-half of a double seal, the other half of which is made from an elastomeric material. The metal seal is disposed on the side facing the union site or junction (that is, the side having the increased temperature). This is preferred for an application where SiSiC tubes are soldered into SiSiC tube plates.

For this purpose, in accordance with yet another feature of the invention, one of the workpieces is a tube plate and the other workpiece is a tube to be to be soldered into place and united with or joined to the tube plate, the tube plate has a side facing toward and a side facing away from the tube, and the at least one shell is in the form of a first shell resting gas-tightly on the side of the tube plate facing away from the tube and a second shell partly surrounding the tube and resting gas-tightly on the side of the tube plate facing toward the tube.

In accordance with yet a further feature of the invention, the heating element is disposed in the interior of the tube in the vicinity of the tube plate In accordance with yet an added feature of the invention, there is provided a stopper firmly closing the free end of the tube.

In accordance with yet an additional feature of the invention, the at least one intermediate space is in the form of one intermediate space disposed between the first shell and the junction and another intermediate space disposed between the second shell and the junction, and including separate heat insulation means disposed in the intermediate spaces and in the free end of the tube.

With these provisions, not only can the union site or junction be closed off from the atmosphere, but additional protection of the shell and seal from the radiant heat is attained as well.

Butt soldering of tubes or tube lengths to one another is also possible. Therefore, in accordance with again another feature of the invention, the at least one shell is in the form of one shell having first and second half-shells, or two shells, through which workpieces in the form of first and second tube lengths can be gas-tightly passed for soldering two tube lengths together.

In accordance with again a further feature of the invention, the heating element includes a plurality of heating wires grouped around the tube lengths parallel to the longitudinal axis thereof. This is done in order to assure uniform heating of the soldering site over the circumference.

In accordance with a concomitant feature of the invention, there are provided separate heat insulation means disposed in the half-shells and preferably in the tube lengths as well.

Other features which are considered as characteristic for the invention are set forth in the appended claims.

Although the invention is illustrated and described herein as embodied in a method for uniting workpieces of silicon-infiltrated silicon carbide with large dimensions in a materially bonded manner and an apparatus for performing the method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 2:
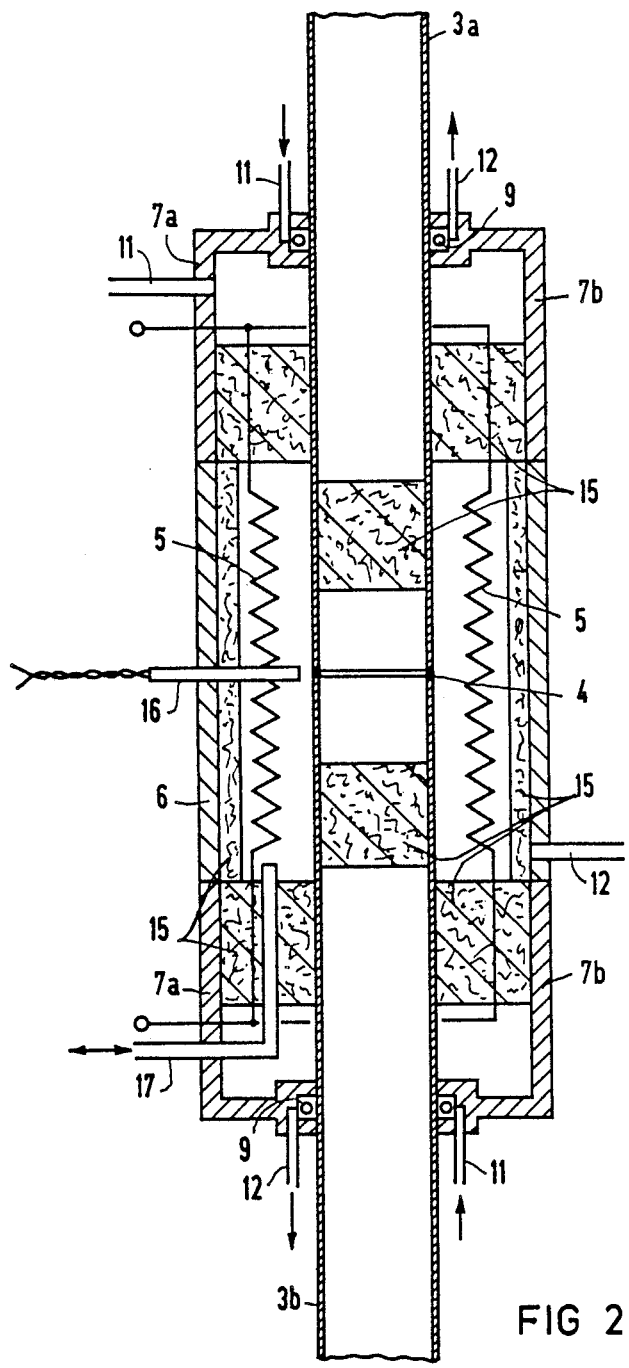

FIG. 1 is a fragmentary, diagrammatic, sectional view of an apparatus for securing tubes to a tube plate by soldering; and FIG. 2, is a diagrammatic, sectional view of an apparatus for uniting two tube lengths to make a longer tube by means of soldering.

Referring now to the figures of the drawing in detail and first, particularly, to FIG. 1 thereof, there are seen openings 2 provided in a tube plate 1 (first workpiece) formed of SiSiC, and heat exchanger tubes 3 (second workpiece) formed of the same material, which are intended to be inserted into these openings in a fluid-tight manner. The union or joint is effected with the aid of a titanium-silicon, cobalt silicon, ferrosilicon, copper gold, glass, or manganese silicon solder 4, which was previously placed in the form of a foil, into a gap (union site or junction) between the wall of the tube plate 1 at the opening 2 and the tube 3. The required heating of the solder 4 to the soldering temperature takes place by means of an electrical heating element 5 of tungsten, iridium, or molybdenum, which is introduced into the end of the tube 3. The heating element 5 may be connected to a source of direct current through a holder 5a. The tube 3 is heated in the vicinity of the union site or junction due to radiant heat aimed at the inside of the tube 3.

The side of the union site or junction remote or facing away from the tube (the underside), is closed off from the surroundings by a first, approximately cup-shaped shell 6. A similar closure is effected on the side facing toward the tube (the upper side), by means of a second shell 7. The shell 7 may be formed of two half-shells united by screws 8, with a non-illustrated seal therebetween. In this case the seam between the two half-shells is located in the plane of the drawing. In principle, the first shell 6 may also be formed of partial or in particular half-shells. The shells 6, 7 are preferably made of metal. The tube 3 is passed through the top of the second shell 7. Sealing of the shells 6, 7 with respect to the tube plate 1 and the tube 3 is effected by elastomer seals 9 which are threaded in at the edge or through the duct. Given a relatively long distance from the union site or junction and correspondingly little temperature load, one such seal 9 suffices. This is shown in the upper portion of the drawing, where the tube 3 is passed through the top of the second shell 7. In contrast, plastically deformable metal seals 10 are placed in such a way as to precede the contact points with the tube plate 1 which are likewise heated by thermal conduction.

Cooling of the seals 9, 10 and of the shells 6, 7 is effected by means of a coolant, such as water, which enters into the interior of the shells 6, 7 through inlet lines 11 in the vicinity of the seals 9 and leaves the interior again through outlet lines 12.

A vacuum can be generated in the vicinity of the union site or junction through a thin tube 17. Alternatively, the union site or junction can be placed in a protective gas atmosphere, for instance an argon, helium or nitrogen atmosphere, through the tube 17. The tube 17 is guided through the shell 6 into the lower end of the tube 3.

As shown in FIG. 1 but not in FIG. 2, the free (upper) end of the tube 3 is plugged with a stopper 13, which may be made of rubber, for instance. The stopper 13 is pressed firmly against the end of the tube with the aid of a clamping device 14. Similar non-illustrated clamping devices assure pressing of the shells 6, 7 against the tube plate 1 and tube 3.

The vicinity of the union site or junction between the tube plate 1 and the tube 3 is insulated with a thermal insulating material 15, for instance silicon carbide whiskers, which are specifically located in the tube 3 and in the shells 6, 7, so that the thermal load on the shells 6, 7, the stopper 13, and other parts is kept low. Monitoring of the soldering temperature is effected by means of a thermocouple 16 disposed in the vicinity of the union site or junction. With the aid of the thermocouple, the optimal soldering temperature which is approximately 1400° C. in this case, can be adhered to by means of follow-up control of the current flowing through the heating element 5.

Tubes 3 of SiSiC are presently available in production lengths of only up to three meters. This means that longer tubes of this material, SiSiC, must be made from individual lengths, or in other words, individual lengths of tube must be soldered together. An apparatus suitable for uniting the individual tube lengths in a materially bonded manner is shown in FIG. 2. Accordingly, the same reference numerals as in FIG. 1 are used for elements that function the same way in FIG. 2. In FIG. 2, the seam between two longitudinally divided half-shells 7a, 7b extends perpendicularly to the plane of the drawing and is therefore not visible. Two tube lengths 3a and 3b of SiSiC are butt-welded together in this case. A ring of solder 4 is placed between the ends of the tube lengths 3a, 3b which face each other, prior to heating. A heating element 5 for generating the required soldering temperature is disposed outside the two tube ends. In particular, the heating element 5 has a number of coiled heating wires disposed parallel to the longitudinal axis of the tube lengths 3a, 3b. The half-shells 7a, 7b are constructed in such a way as to be large enough to cause the passage of the tube lengths 3a, 3b through the half-shells to be disposed so far away from the region heated by the heating element 5, that elastomeric seals 9 are sufficient and metal seals 10 can be dispensed with.

We claim:

1. Apparatus for uniting workpieces of silicon-infiltrated silicon carbide, comprising at least one shell gas-tightly enclosing each of two silicon-infiltrated silicon carbide workpieces in the vicinity of a junction between the workpieces, defining at least one intermediate space between said at least one shell and the workpieces; a line communicating with said at least one intermediate space for adjusting the atmosphere therein; a heating element in the vicinity of the junction for locally heating the junction to soldering temperature and materially bonding the workpieces with solder at the junction; and a cooling apparatus for cooling said at least one shell.

2. Apparatus according to claim 1, wherein said line includes means for maintaining a vacuum in said at least one intermediate space.

3. Apparatus according to claim 1, wherein said line includes means for maintaining an inert gas atmosphere in said at least one intermediate space.

4. Apparatus according to claim 1, wherein said heating element is formed of a material from the group consisting of tungsten, iridium and molybdenum and is sufficient for radiating heat onto the junction provided with solder.

5. Apparatus according to claim 1, including an elastomer seal disposed between said at least one shell and the workpieces.

6. Apparatus according to claim 7, including at least one elastomer seal being disposed between said at least one shell and the workpieces and being cooled by said cooling apparatus.

7. Apparatus according to claim 1, including at least one plastically deformable metal seal disposed between said at least one shell and the workpieces.

8. Apparatus according to claim 1, wherein said at least one shell is in the form of one shell having first and second half-shells through which workpieces in the form of first and second tube lengths can be gas-tightly passed for soldering two tube lengths together.

9. Apparatus for uniting workpieces of silicon-infiltrated silicon carbide, wherein one of the workpieces is a tube plate and the other workpiece is a tube to be joined to the tube plate, and the tube plate has a side facing toward and a side facing away from the tube, comprising shells gas-tightly enclosing the workpieces in the vicinity of a junction between the workpieces, defining at least one intermediate space between said shells and the workpieces, said shells being in the form of a first shell resting gas-tightly on the side of the tube plate facing away from the tube and a second shell partly surrounding the tube and resting gas-tightly on the side of the tube plate facing toward the tube; a line communicating with said at least one intermediate space for adjusting the atmosphere therein; and a heating element in the vicinity of the junction for locally heating the junction to soldering temperature and materially bonding the workpieces with solder at the junction.

10. Apparatus according to claim 9, wherein said heating element is disposed in the interior of the tube in the vicinity of the tube plate.

11. Apparatus according to claim 9, including a stopper firmly closing the free end of the tube.

12. Apparatus according to claim 9, wherein said at least one intermediate space is in the form of one intermediate space disposed between said first shell and said junction and another intermediate space disposed between said second shell and said junction, and including separate heat insulation means disposed in said intermediate spaces and in the free end of the tube.

13. Apparatus according to claim 8, wherein said heating element includes a plurality of heating wires grouped around the tube lengths parallel to the longitudinal axis thereof.

14. Apparatus according to claim 8, including separate heat insulation means disposed in said half-shells.

15. Apparatus according to claim 8, including separate heat insulation means disposed in said half-shells and in the tube lengths.

* * * * *